(12) United States Patent
Sonke et al.

(10) Patent No.: US 8,442,294 B2
(45) Date of Patent: May 14, 2013

(54) MOTION ARTEFACT REDUCTION IN CT SCANNING

(75) Inventors: Jan-Jakob Sonke, Amsterdam (NL); Marcel van Herk, Amsterdam (NL); Peter Remeijer, Amsterdam (NL)

(73) Assignee: Elekta AB (publ) (SE)

( * ) Notice: Subject to any disclaimer, the term of this patent is extended or adjusted under 35 U.S.C. 154(b) by 713 days.

(21) Appl. No.: 12/601,442

(22) PCT Filed: May 31, 2007

(86) PCT No.: PCT/EP2007/004812
§ 371 (c)(1),
(2), (4) Date: Nov. 23, 2009

(87) PCT Pub. No.: WO2008/145161
PCT Pub. Date: Dec. 4, 2008

(65) Prior Publication Data
US 2010/0166286 A1    Jul. 1, 2010

(51) Int. Cl.
*G06K 9/00* (2006.01)
*A61B 6/00* (2006.01)

(52) U.S. Cl.
USPC ............. 382/132; 382/131; 378/4; 378/8

(58) Field of Classification Search .......... 382/131, 382/132; 378/4, 8, 19
See application file for complete search history.

(56) References Cited

U.S. PATENT DOCUMENTS

| | | | | |
|---|---|---|---|---|
| 4,858,128 A | * | 8/1989 | Nowak | 382/131 |
| 6,915,005 B1 | * | 7/2005 | Ruchala et al. | 382/131 |
| 7,415,093 B2 | * | 8/2008 | Tkaczyk et al. | 378/8 |
| 7,844,317 B2 | * | 11/2010 | Salla et al. | 600/407 |
| 2004/0218719 A1 | * | 11/2004 | Brown et al. | 378/95 |
| 2004/0234115 A1 | * | 11/2004 | Zijp et al. | 382/131 |
| 2007/0025496 A1 | * | 2/2007 | Brown et al. | 378/8 |
| 2007/0127809 A1 | * | 6/2007 | Leach et al. | 382/154 |
| 2007/0195091 A1 | * | 8/2007 | Urushiya | 345/427 |
| 2011/0206178 A1 | * | 8/2011 | Van Herk et al. | 378/19 |

FOREIGN PATENT DOCUMENTS

| | | |
|---|---|---|
| JP | 2003-164446 | 6/2003 |
| JP | 2005-529658 | 10/2005 |
| JP | 2006-515770 | 6/2006 |
| WO | 2004066211 A | 8/2004 |
| WO | 2005015502 A | 2/2005 |
| WO | 2005107597 A | 11/2005 |

OTHER PUBLICATIONS

Zijp, L. et al., "Extraction of the Respiratory Signal from Sequential Thorax Cone-Beam X-Ray Images", Proceedings of the International Conference on the Use of Computers in Radiation Therapy, No. 14th, 2004.

(Continued)

*Primary Examiner* — Alexander H Taningco
(74) *Attorney, Agent, or Firm* — Westman, Champlin & Kelly, P.A.; Z. Peter Sawicki

(57) ABSTRACT

An example of sporadic motion that causes difficulty in CT scanning is gas pockets moving around the rectum. The invention allows the automatic detection of such movements, by enhancing low density features around the prostate in the individual X-ray images, projecting these features on the cranio-caudal axis (assuming that the gas predominantly moves in this direction) to form a 1-dimensional image, and combining successive ID projections to form a 2D image. Moving gas will produce tilted lines in this image, identifying an angular range that needs to be discarded. Such a process can be used in an image processing apparatus of a CT scanner.

17 Claims, 4 Drawing Sheets

OTHER PUBLICATIONS

Sonke, Jan-Jakob et al., "Respiratory Correlated Cone Beam CT" Medical Physics, AIP, Melville, NY, US, vol. 32, No. 4, Mar. 30, 2005, pp. 1176-1186.

Hong, Jiang et al.: "Dynamic Imaging by Object Modeling and Estimation" Proceedings in the International Conference on Image Processing, Washington, Oct. 23-26, 1995, Los Alamitos, IEEE Comp. Soc. Press, US, vol. 3, pp. 645-648.

International Search Report, Mar. 6, 2008.

PCT Written Opinion of the International Search Authority.

Chinese Office Action; Application No. 2007800531579; Nov. 17, 2011.

Japanese Office Action; Application No. 2010-509685; Mar. 27, 2012.

\* cited by examiner

MOTION ARTEFACT REDUCTION IN CT SCANNING

This application is a Section 371 National Stage Application of International Application No. PCT/EP2007/004427, filed May 17, 2007 and published as WO 2008/141656 A1 on Nov. 27, 2008, the content of which is hereby incorporated by reference in its entirety.

FIELD OF THE INVENTION

The present invention relates to the reduction of motion artefacts in CT scanning.

BACKGROUND ART

Cone beam computer tomography (CBCT) assumes that the scanned object is static. When the object changes during scanning, this intra-scanning motion induces blurring and streak artefacts. These artefacts hamper image guided radiotherapy (IGRT) applications, as they reduce the success rate and accuracy of automatic registration techniques and hamper visual inspection.

For periodic motions, such as breathing, motion artefacts can be managed by respiratory correlated imaging techniques, i.e., exploiting the periodic feature of such motion through retrospective sorting of projection images into phase bins yielding four dimensional datasets. Non-periodic or sporadic motion (such as moving gas in the rectum) presents a difficulty.

SUMMARY OF THE INVENTION

We have developed an alternative method for dealing with sporadic motion. The method is able to take advantage of the redundant information that is available in extended field of view CBCT scanning geometry. Thus, projection-images containing moving structures can be discarded in order to obtain a consistent subset of projection-images.

The principal example of sporadic motion is gas pockets moving in the rectum and other bowel areas, as this is an example of a significant change that can take place near to a structure than commonly requires radiotherapeutic treatment, i.e. the prostate. Accordingly, the remainder of this application will describe the detection of such gas pockets and their movement, although it should be understood that the techniques are applicable to the detection of any sporadic movement in a CT scan and the alleviation of motion artefacts that result.

The first step is to automatically detect moving gas in the rectum. The principal idea is to enhance low density features around the prostate in the individual X-ray images, project these features on the cranio-caudal axis (assuming that the gas predominantly moves in this direction) to form a 1-dimensional image, and combine successive 1D projections to form a 2D image. Moving gas will produce tilted lines in this image, identifying an angular range that needs to be discarded.

Secondly, tapers identifying the central part and the periphery and appropriate parker weighting accounting for the partial scan have to be generated and applied to the projection-data, to obtain an artefact free reconstruction based on the remaining projection-images.

The method has been tested on 7 CBCT-scans of different prostate cancer patients enrolled in our adaptive RT protocol that exhibited substantial motion artefacts. Streak artefacts were substantially reduced and a sharpness of the gas-to-tissue interface was on average improved by a factor 2.

The present invention therefore provides an image processing method comprising the steps of gathering a collection of two-dimensional x-ray images of a subject, ordered in time sequence, for each image of the collection, projecting at least part of the image to a projection axis, to derive a collection of one-dimensional images aligned with the projection axis and whose pixel values represent a sum of pixel values in the respective two-dimensional image transverse to the projection axis, assembling the one-dimensional images to form a single two dimensional image having a spatial dimension aligned with the projection axis and a time dimension transverse to the projection axis, and detecting tilted features in the two dimensional image.

This enables a new collection to be prepared, being the original collection after deletion of the subset of images contributing to the tilted features and (optionally) the images before or after the tilted features. The new collection can then be used as the basis for a CT reconstruction omitting some of the motion artefacts that arise from a reconstruction using the original collection.

We prefer that the whole of the image is projected. This then ensures that the redundant area of the image is included; i.e. that part of the image showing regions of the subject that are always in the view. Certain CT scanning geometries produce images that are partly redundant in this way, as will be described below with reference to FIG. 2.

The images of the collection preferably comprise images of substantially the same subject albeit from different viewpoints. The different viewpoints can, for example, comprise views along a plurality of directions in substantially the same plane, the plurality of directions converging on an image axis transverse to the plane. Such images are produced by an imaging system that rotates about a rotation axis that is within the field of view of the imaging system. That image axis is preferably parallel to and/or coincident with the projection axis.

The projection step can involve summing the total pixel value along a direction transverse to the projection axis, which can then be normalised to create (in effect) an average value. The aim is to create a pixel value that represents the general level of brightness or intensity along the direction, so a sum or average will be appropriate. Other algorithms may be shown to be suitable. The projection axis is preferably parallel to an edge of the image, to ease the arithmetic processing load.

The subject of the images is suitably a patient, particularly the prostate region of a patient as that tends to suffer particularly from the sporadic motion which the present invention is best able to deal with. In this case, the projection axis is preferably aligned with the craniocordal axis of the patient, as the sporadic movement is usually in that general direction. Other orientations may be adopted in cases where the movement is aligned in a different direction, however.

The present invention further relates to an image processing apparatus containing a computing means adapted to perform the process of any one of the preceding claims, and to a CT scanner containing such an image processing apparatus.

BRIEF DESCRIPTION OF THE DRAWINGS

An embodiment of the present invention will now be described by way of example, with reference to the accompanying figures in which.

DETAILED DESCRIPTION OF THE EMBODIMENTS

The uncertainty in the position of mobile organs over the course of a treatment limits the accuracy of radiotherapy (RT). Cone beam CT (CBCT) integrated with a linear accelerator allows contact-less and fast localization of soft-tissue structures and therefore provides a powerful tool for image guided RT techniques (IGRT). The mathematical model of computer tomography does however rely on an inherent assumption that the scanned object is static. When the object changes during scanning, however, this intra-scanning motion induces artefacts in the resulting reconstruction. Due to the slow rotation speed of CBCT apparatus integrated with the linear accelerators used in RT (of the order of 30 s to 4 minutes per rotation), it is mainly blurring and streak artefacts that are induced. These artefacts hamper IGRT applications, as they reduce the success rate and accuracy of automatic registration techniques.

For periodic motion such as breathing, motion artefacts can be managed by respiratory correlated imaging techniques, i.e. exploiting the periodic feature of such motion through retrospective sorting of consecutive projection images into different phase bins yielding four dimensional (4D) datasets. To deal with sporadic motion, we propose an alternative method based on the redundant information available in an extended field of view (FOV) CBCT scanning geometry. The redundancy allows projection images containing moving structures to be discarded, to obtain a consistent subset of projection images.

CBCT scans of prostate cancer patients were therefore acquired for an offline shrinking action level protocol based on bony alignment, or alternatively for an adaptive radiotherapy (ART) protocol initiating re-planning after the first week of treatment taking into account organ motion assessed over the first five CBCT scans. CBCT scans were made using Elekta Synergy 3.5 (Elekta Oncology Systems Ltd, Crawley, West Sussex, United Kingdom) at a so-called medium FOV (40 cm diameter in the axial plane). The imager of the system operates at a frame-rate of 5.5 fps, images are stored at a resolution of 0.5 mm×0.5 mm and processed at a resolution of 1 mm×1 mm. CBCT acquisition time (including reconstruction) takes about 2 min.

The axial FOV of a CBCT scanner depends on the size of the imager and its position relative to the central axis. With a centrally positioned detector, a short scanning technique (rotating the system over 180°±twice the cone angle) with appropriate Parker Weighting provides an axial FOV equal to the effective size of the imager at the iso-center plane (typically 20-25 cm).

Figure 2:
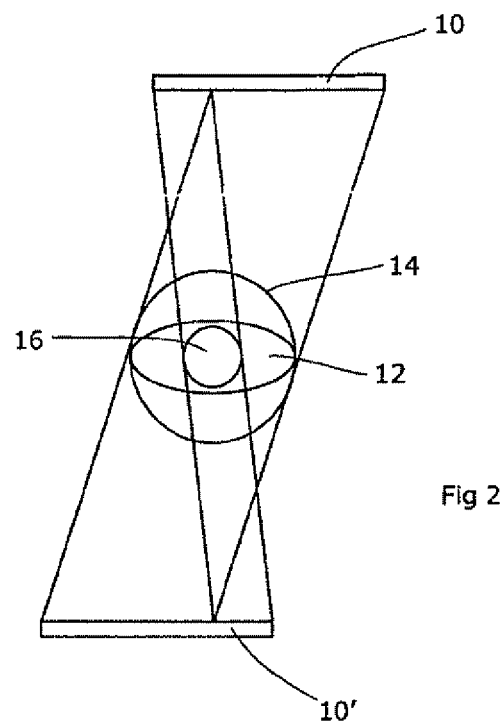
FIG. 2 shows a schematic representation of the displaced detector scanning geometry.

FIG. 2 illustrates the geometry, and shows that the flat panel detector 10 is partially displaced in the axial plane opposite to the central axis. The elliptical object 12 is too large to be completely projected on the panel 10; by partly displacing the detector 10, the FOV of the scanner is extended to the circle shown as 14, scanning each side of the object over only a section of a full rotation. Only the central part (circle 16) is seen over the full rotation.

Thus, by partially displacing the detector in the axial plane opposite to the central axis and rotating over an arc of 360', an extended FOV can be obtained. Doing so, the periphery 14 of the FOV is effectively scanned over 180', while the central part 16 is scanned over the full 360'. In order to account for data redundancy in the central part 16, the following data weighting can be applied:

$$W(u) = 1 - \frac{1}{2}S(u - D + d, d) - \frac{1}{2}S(u + D - d, d) \quad (1)$$

with u being the axial detector coordinate, D half the size of the central region 16 containing redundant information, S a smooth S-shaped function of the form;

$$S(x, d) = \begin{cases} 0, & x \leq -d \\ \frac{1}{2}\left[1 + \sin\left(\frac{\pi \arctan\left(\frac{x}{R}\right)}{2\arctan\left(\frac{d}{R}\right)}\right)\right], & |x| < d \\ 1, & x \geq d \end{cases} \quad (2)$$

Figure 3:
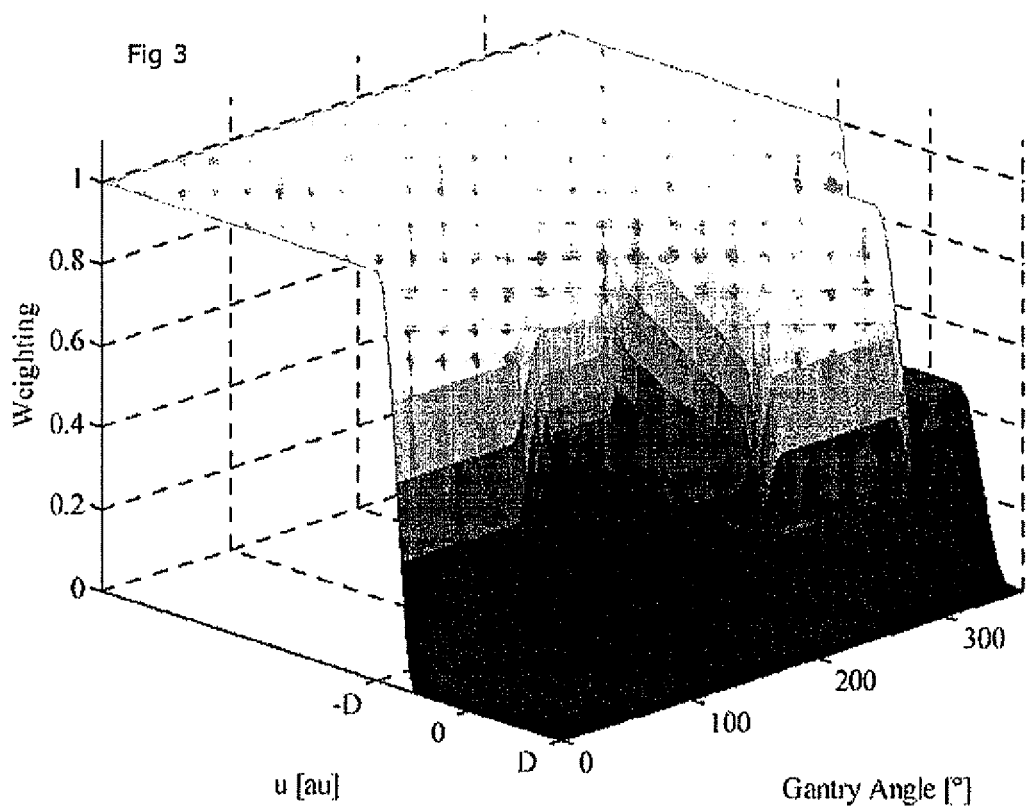
FIG. 3 shows a graphical representation of the data-weighting as described by Equation 3.

R the source-to-detector distance and d a steepness parameter that needs to satisfy d<D/2. Equation 1 describes a trapezoid data weighting similar to a u profile at a gantry angle of 150°, as shown in FIG. 3. The advantage of the trapezoid shaped weighting function over a single S-shaped function as proposed by Wang (Wang G. "X-ray micro-CT with a displaced detector array" Med Phys. 2002; c29: 1634-6) is an improved signal-to-noise ratio in the central region while maintaining smoothness at the edges to prevent high spatial frequency artefacts.

The redundancy in the central region of the scan allows us to discard the part of the projection image corresponding to the central region of a subset of images, to re-establish consistency in the dataset. Subsequently, the data weighting described in Equation 1 needs to be adapted. We propose the following weighting function;

$$W(u,a) = 1 - S(u-D=D,d) + (S(u-D+d) - S(u+D-d,d))\omega_N(\beta,u) \quad (3)$$

with $\omega_N(\beta,u)$ the modified parker weights for linear arrays as described by Wesarg et al. (Wesarg S, Ebert M and Bortfeld T, "Parker weights revisited", Med Phys. 2002; 29: 372-8) and β the gantry angle. Equation 3 effectively divides the projection images into 2 regions, the periphery 14 that is reconstructed similar to Equation 1 and the central area 16 that is reconstructed as if scanned using a short scan technique. The modified parker weighting $\omega_N(\beta,u)$ also uses trapezoid shaped weighting to optimize signal-to-noise ratios.

Equation 3 is shown graphically in FIG. 3; in this example, the area of the projection images corresponding to the central region (u>−D) acquired over the first 90° were discarded. Projections acquired for gantry angles larger than 90° were weighted using a trapezoid parker function for u>−D and unweighted for u≦−D. Note that at most images acquired over an arc of 180°−2× cone angle can be (partly) discarded.

In order to select the images to be discarded, an automatic motion detection algorithm was developed. It is modified from the automatic breathing signal extraction system described by Zijp et al. (Zijp L, Sonke J-J, van Herk M, "*Extraction of the respiratory signal from sequential thorax Cone-Beam X-ray images*", Proceedings of the 14th ICCR Seoul, Korea, 2004). After motion artefacts are identified in an initial reconstruction of the projection data, the rectum in the proximity of the prostate is selected using a rectangular shaped volume of interest (VOI). Subsequently, the 3D VOI is projected onto each X-ray image with the appropriate gantry angle to crop the corresponding region of interest, after which low density features are enhanced using a gradient filter in the vertical direction. After Zijp et al. these features are projected on the cranio-caudal axis (assuming the gas predominantly moves in this direction) and the successive 1D projections are combined to form a 2D image. Moving gas (i.e., enhanced low density features that change vertical position in subsequent projections) produce tilted features in this image representing an angular range that was subject to a sporadic motion.

A computer algorithm detects these tilted features automatically, or (alternatively) several reconstructions are made assuming sporadic motion at different time points through the acquisition. The selection of the best reconstruction is then made visually or by its suitability for automatic image guidance.

An automatic detection can operate by, for example:
Calculate the horizontal derivative
Threshold the image at 20% of the maximum image intensity
Calculate and sort on vertical depth (highest–lowest point of structures)
but other methods are also useable.

Finally, features that are sufficiently big and are more long than square are selected by the following criteria:
Area (A)>50 pixel$^2$
Elongatedness=A/t$^2$>10, with t the number of steps required to erode the structure In case of moving gas pockets, two modes of motion are possible: first, after the motion the anatomy returns to its original position; second, after the motion, the anatomy remains in a new configuration. In the first case, it suffices to discard only the images containing the motion. In the latter case, all the images either prior to or after the motion need to be discarded. Currently, we always assume the second mode of motion although it is possible that in some circumstances the first mode may apply. When multiple regions manifest motion and cannot both be discarded while maintaining sufficient data (acquired over 180°+2× cone angle), only the region(s) identifying the largest motion are discarded.

Seven CBCT scans of seven prostate cancer patients exhibiting substantial motion artefacts were re-reconstructed using the motion artefact reduction method. The effect of the motion artefact reduction was quantified by the sharpness of the (moving) gas-to-tissue interface pre- and post-correction. To that end, the average voxel intensity within the gas-pocket and the surrounding tissue was determined. Subsequently, the volumes represented by the iso-intensity at 30% and 70% of the average intensity differences were determined. Finally, the average distance between those two volumes $V_{70}$ and $V_{30}$ were calculated for both the pre- and post-scan and the ratio was calculated according to $$R_{30\text{-}70} = \frac{\langle V_{70}^{Post} - V_{30}^{Post}\rangle}{\langle V_{70}^{Pre} - V_{30}^{Pre}\rangle} \quad (4)$$

FIG. 4 graphically represents the steps of the automatic motion detection process. This is applied to the sequence of projection images of the scan shown in FIG. 5a, which illustrates the impact of a large, moving gas pocket during CBCT image acquisition of the pelvic region on the CBCT reconstruction result. Streak artefacts and ambiguous gas-to-tissue boundaries are visible in the transverse and sagittal slices of the reconstruction result.

Figure 4A:
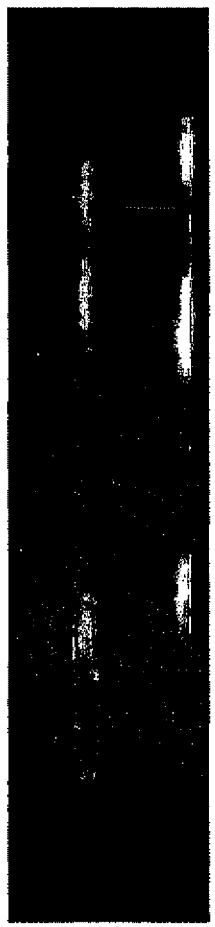
FIG. 4 shows a graphical representation of sequential steps in the automatic motion detection procedure.
Figure 4B:
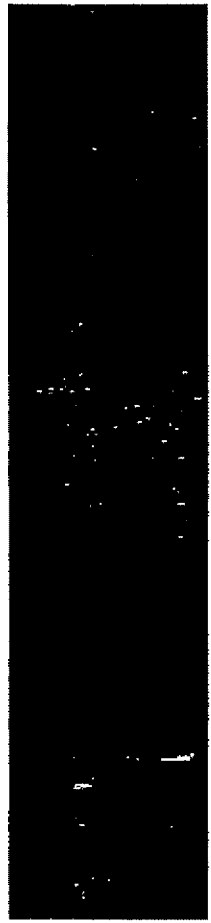
Figure 4C:
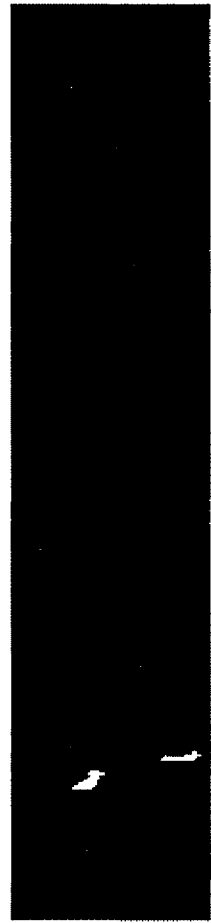
Figure 5A:
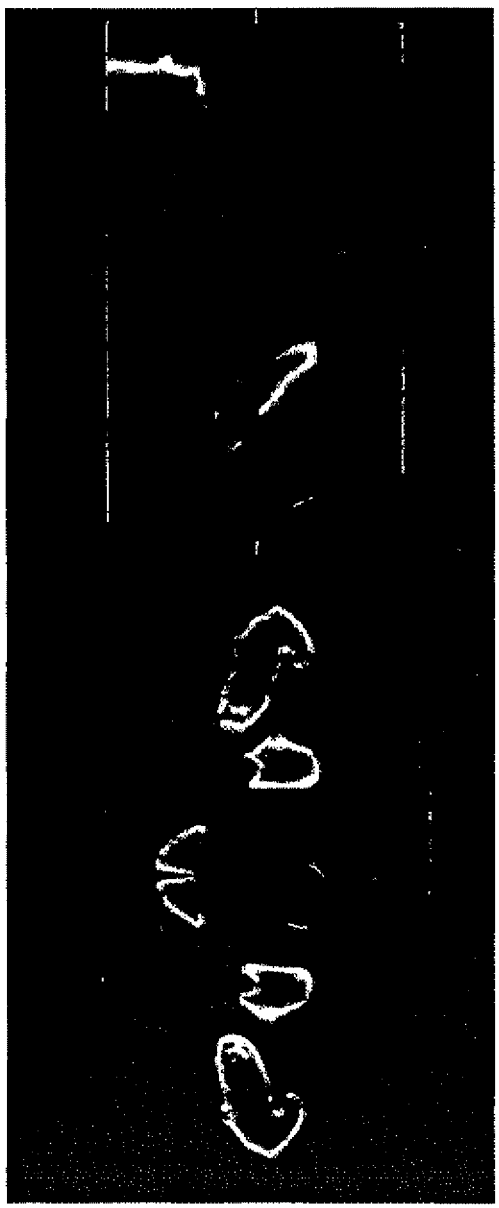
FIG. 5 shows transverse and sagittal slices of reconstruction results with and without artefact reduction.
Figure 5B:
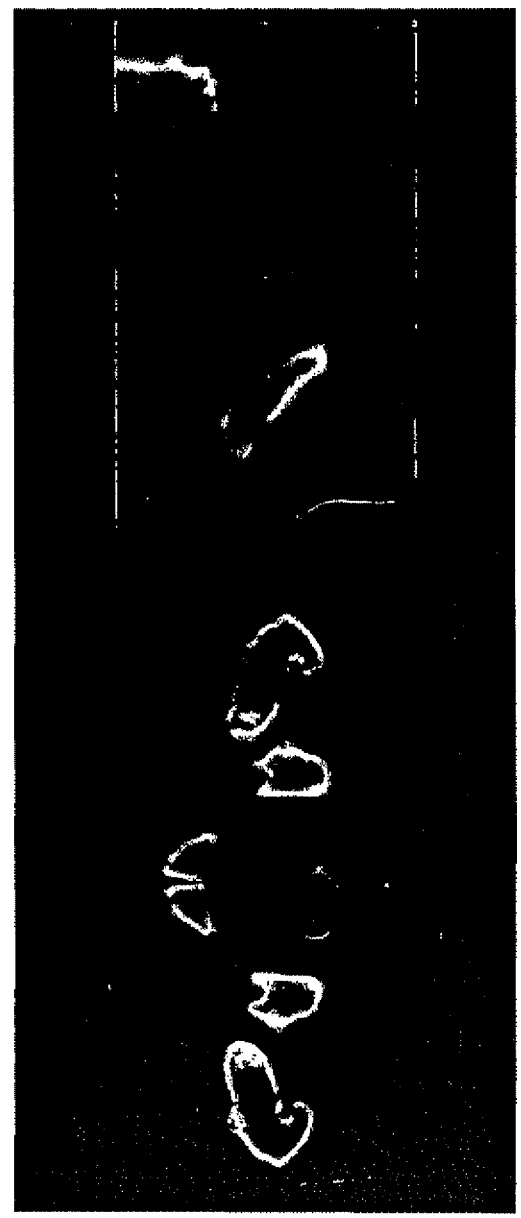

FIG. 4a shows the image obtained by projecting enhanced features on the cranio-caudal axis and concatenating the successive 1D projections. Around gantry angle −130° to −110°, two tilted features at different heights can be seen representing enhanced features changing position in time. In order to enhance these features, the horizontal (temporal) derivative is taken, shown in FIG. 4b, which will enhance noise in the image. In a number of noise reduction steps, the tilted and/or elongated features are identified as shown in FIG. 4c. These, already present in FIGS. 4a and 4b, represent the regions subject to motion. Given the identified regions, the projections taken at gantry angles less than −110° were discarded, and a new reconstruction was made from the remaining images, as shown in FIG. 5b. Streak artefacts are substantially reduced as shown in the transverse slice as a result of re-establishing consistency in the projection images. Moreover, the gas-to-tissue interface is much sharper, indicating that the gas pocket was stationary in the sequence of projection images used.

Table 1 shows the result of the analysis on the sharpness of the gas-to-tissue interface for the seven patients. Clearly, the increase in the sharpness of the gas-to-tissue interface varies substantially between patients. This is mainly caused by the fact that some patients manifest motion over a large portion of the scan, such that the discarded sub-set of images is so large that the final image quality suffers and is only moderately improved relative to the original. On average the $R_{30\text{-}70}$ was 0.43±0.33 (1 SD), i.e., the width of the gas-to-tissue interface was reduced by more than a factor of 2.

TABLE 1

Improvement in the sharpness of the gas-to-tissue interface due to the motion artefact reduction procedure expressed by the $R_{30\text{-}70}$ for 7 prostate cancer patients.

| | Patient# | | | | | | |
|---|---|---|---|---|---|---|---|
| | 1 | 2 | 3 | 4 | 5 | 6 | 7 |
| $R_{30\text{-}70}$ | 0.81 | 0.26 | 0.06 | 0.07 | 0.36 | 0.80 | 0.68 |

For situations in which sporadic movement in more than one dimension is possible, the process could be repeated in both axes.

Figure 1:
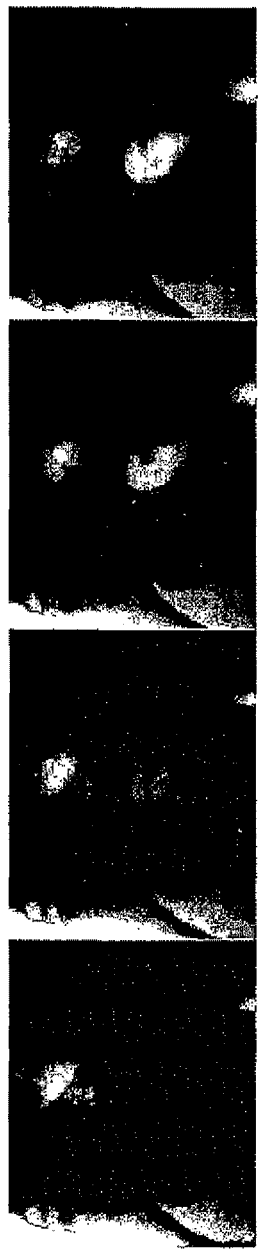
FIG. 1 illustrates sequential projection images showing a gas pocket as a bright structure emerging in the rectum over a time span of approximately 2 s, at a position where the prostate would be projected in the projection images.
Figure 6:
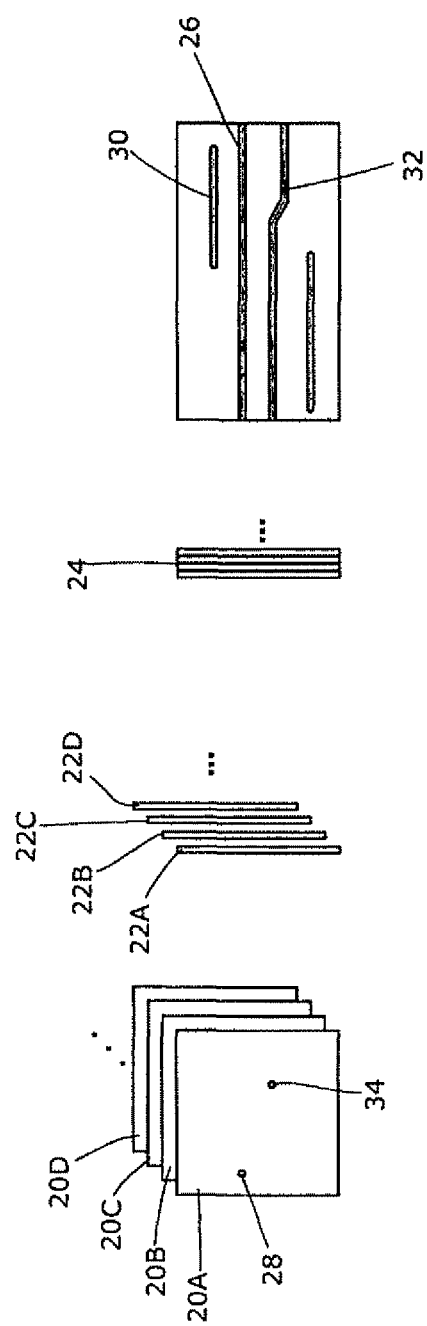
FIG. 6 shows a schematic representation of the image processing method of the present invention.

FIG. 6 illustrates the essential elements of the above-described process in schematic form. A series of images 20A, 20B, 20C, 20D etc are obtained from the scanning apparatus. Each of these is then condensed down to a one-dimensional line of pixels 22A, 22B, 22C, 22D etc by (in this example) summing the pixels horizontally and normalising to give an average pixel value for that line. These one-dimensional images are then juxtaposed to create a two dimensional composite image 24.

This composite image 24 contains three general types of structure. The first is a continuous horizontal line across the image such as structure 26. This corresponds to a feature 28 in the image that is present in the redundant are of the image, and is therefore present in all the images. A streak will thus appear at that height in the composite image. The second is a horizontal line that extends part-way across the image, such as structure 30. This corresponds to a feature that is present in some images in the sequence but not others, and it likely to be a feature in the non-redundant are of the image.

The last is a line in the image that is non-horizontal, i.e. sloping or tilted such as structure 32. This corresponds to a feature 34 in the image that moves vertically in the images at some point in the sequence. This indicates a change in the subject during the image sequence, and is highlighted by the process of the present invention.

It will of course be understood that many variations may be made to the above-described embodiment without departing from the scope of the present invention.

Although the present invention has been described with reference to preferred embodiments, workers skilled in the art will recognize that changes may be made in form and detail without departing from the spirit and scope of the invention.

The invention claimed is:

1. An image processing method comprising the steps of:
    gathering a collection of two-dimensional x-ray images of a subject, ordered in time sequence;
    for each image of the collection, projecting at least part of the image to a projection axis, to derive a collection of one-dimensional images aligned with the projection axis and whose pixel values represent a sum of pixel values in the respective two-dimensional image transverse to the projection axis;
    assembling the one-dimensional images to form a single two dimensional image having a spatial dimension aligned with the projection axis and a time dimension transverse to the projection axis;
    detecting features that are tilted in the two dimensional image with respect to the time and spatial dimensions.

2. The image processing method according to claim 1 in which a new collection is subsequently prepared, being the original collection after deletion of at least the images contributing to the tilted features.

3. The image processing method according to claim 1 in which a new collection is subsequently prepared, being original collection after removal of the subset containing images prior to and contributing to the tilted features.

4. The image processing method according to claim 1 in which a new collection is subsequently prepared, being original collection after removal of the subset containing images subsequent to and contributing to the tilted features.

5. The image processing method according to claim 1 in which the whole of the image is projected.

6. The image processing method according to claim 1 in which the images of the collection comprise images of substantially the same subject albeit from different viewpoints.

7. The image processing method according to claim 6 in which the different viewpoints comprise views along a plurality of directions in substantially the same plane, the plurality of directions converging on an image axis transverse to the plane.

8. The image processing method according to claim 7 in which the image axis is parallel to the projection axis.

9. The image processing method according to claim 7 in which the image axis is coincident with the projection axis.

10. The image processing method according to claim 1 in which the projection step involves summing the total pixel value along a direction transverse to the projection axis.

11. The image processing method according to claim 10 in which the total pixel value is then normalised.

12. The image processing method according to claim 10 in which the projection axis is parallel to an edge of the image.

13. The image processing method according to claim 1 in which the subject of the images is a patient.

14. The image processing method according to claim 13 in which the images include the prostate region of the patient.

15. The image processing method according to claim 13 in which the projection axis is aligned with the craniocordal axis of the patient.

16. An image processing apparatus containing a computing means adapted to perform the process comprising:
    gathering a collection of two-dimensional x-ray images of a subject, ordered in time sequence;
    for each image of the collection, projecting at least part of the image to a projection axis, to derive a collection of one-dimensional images aligned with the projection axis and whose pixel values represent a sum of pixel values in the respective two-dimensional image transverse to the projection axis;
    assembling the one-dimensional images to form a single two dimensional image having a spatial dimension aligned with the projection axis and a time dimension transverse to the projection axis;
    detecting features that are tilted in the two dimensional image with respect to the time and spatial dimensions.

17. A CT scanner containing an image processing apparatus adapted to perform the process comprising:
    gathering a collection of two-dimensional x-ray images of a subject, ordered in time sequence;
    for each image of the collection, projecting at least part of the image to a projection axis, to derive a collection of one-dimensional images aligned with the projection axis and whose pixel values represent a sum of pixel values in the respective two-dimensional image transverse to the projection axis;
    assembling the one-dimensional images to form a single two dimensional image having a spatial dimension aligned with the projection axis and a time dimension transverse to the projection axis;
    detecting features that are tilted in the two dimensional image with respect to the time and spatial dimensions.

* * * * *